Feb. 26, 1924.

S. P. THORINGTON

SEPARABLE RIM

Filed May 20, 1922    2 Sheets-Sheet 1

1,484,915

Sidney P. Thorington
INVENTOR

BY Victor J. Evans
ATTORNEY

WITNESS:

Feb. 26, 1924.                                                         1,484,915
S. P. THORINGTON
SEPARABLE RIM
Filed May 20, 1922       2 Sheets-Sheet 2

Sidney P. Thorington
INVENTOR
BY Victor J. Evans
ATTORNEY

WITNESS

Patented Feb. 26, 1924.

1,484,915

UNITED STATES PATENT OFFICE.

SIDNEY P. THORINGTON, OF BISHOP, CALIFORNIA.

SEPARABLE RIM.

Application filed May 20, 1922. Serial No. 562,407.

*To all whom it may concern:*

Be it known that I, SIDNEY P. THORINGTON, a citizen of the United States, residing at Bishop, in the county of Inyo and State of California, have invented new and useful Improvements in Separable Rims, of which the following is a specification.

This invention relates to demountable rims for vehicles and has for its object the provision of a rim of peculiar formation which is split longitudinally instead of transversely as is commonly the case and which is provided with novel means for clamping the two sections together, the rim having the advantage of permitting easy removal and replacement of a tire without necessitating prying off of the tire or contraction and subsequent expansion as is necessary in the case of the ordinary split rim.

An important object is the provision of a rim of this character in which the securing members are so mounted that when swung into released position they will still remain properly upon one of the rim sections so as not to be lost.

An additional object is the provision of a device of this character which will be simple and inexpensive in construction, highly efficient and durable in use and a general improvement in the art.

With the above and other objects and advantages in view, the invention consists in the details of construction to be hereinafter more fully described and claimed, and illustrated in the accompanying drawings, in which:

Figure 1:
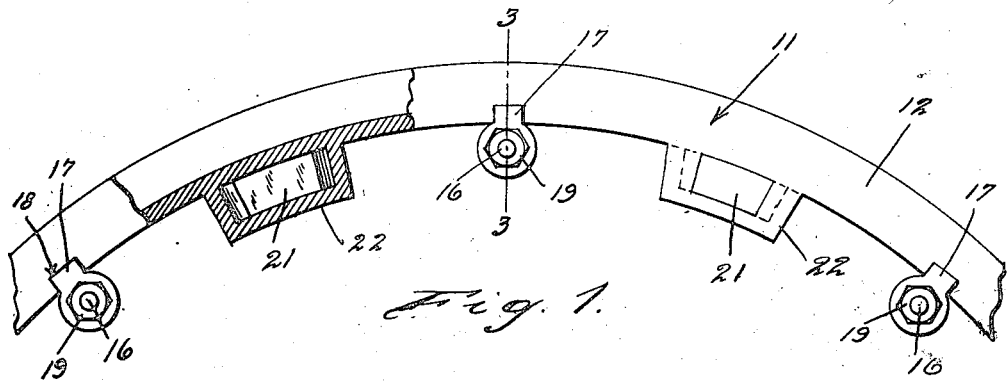
Figure 1 is a side elevation of the rim, partly in section.
Figure 2:
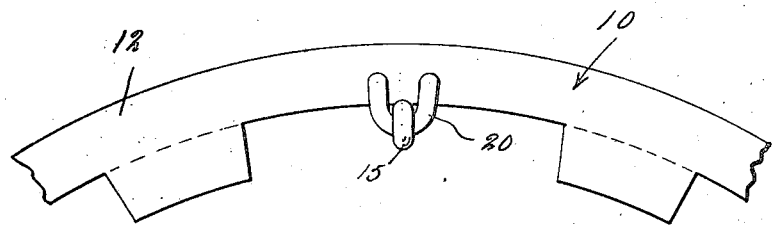
Figure 2 is a fragmentary elevation of the opposite side.
Figure 3:
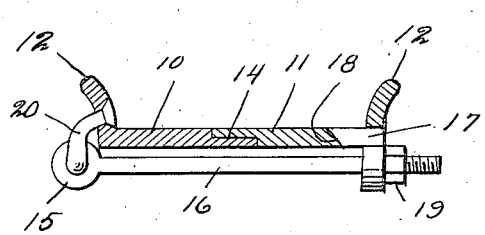
Figure 3 is a cross sectional view therethrough taken through one of the securing members and showing the parts in locked together position.
Figure 4:
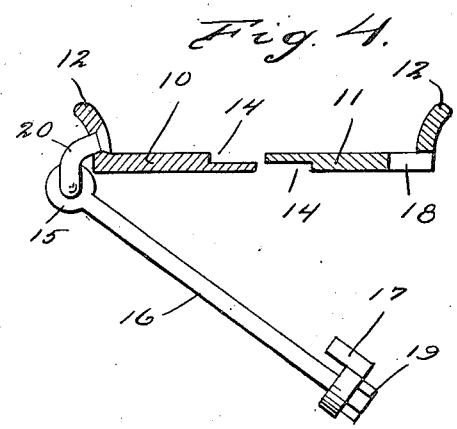
Figure 4 is a similar view showing the locking means in released position.
Figure 5:
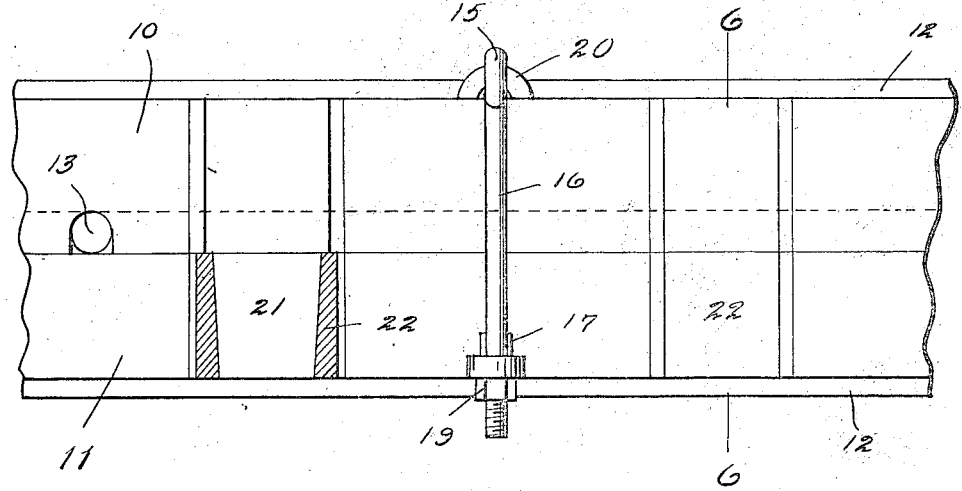
Figure 5 is a detail view partly in section looking at a portion of the inner periphery of the rim and showing the mounting of the locking members.
Figure 6:
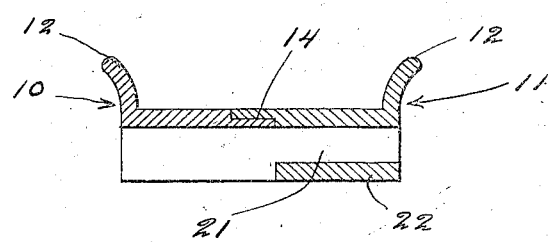
Figure 6 is a detail cross section on the line 6—6 of Figure 5 and, Figure 7 is a detailed perspective view of one of the wedge members.
Figure 7:
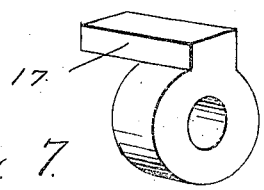

Referring more particularly to the drawings I have shown my rim as formed in two sections 10 and 11, these sections being designed to be secured together and having their outer edges formed with tire engaging and retaining flanges 12. The usual hole 13 is provided for the passage of the valve stem of the inflatable tube of the tire. The meeting edges of the rim sections 10 and 11 are preferably either offset with respect to each other or cut away as shown at 14 so that the two sections will have a species of telescopic engagement and will operate to brace each other.

Hinged upon one section, as shown at 15 is a plurality of bolts 16 which are thus permanently associated with the section and prevented from being lost. Slidably engaged upon the bolts 16 are hook shaped lugs 17 adapted to enter slots 18 formed in the outer edge of the other section for clamping the two sections together. Any suitable nuts 19 are threaded on to the bolts for forcing the lugs into position. In actual practice the bolts 16 may be eye bolts and held upon the associated rim by means of staples or the like on the rim section passing through the eyes of the bolts. These staples are illustrated at 20 though it should be understood that they might be replaced by some other equivalent structure. Formed on one section are wedge shaped members 21 which fit within sockets 22 on the other section, the purpose being to dispose the two sections in such position, when assembling, that the bolts 16 will be opposite the notches which receive the member 17.

Assuming that the two sections are disassembled, it is readily apparent that a tire may be placed in position with its beads engaging upon the two sections, after which the sections are moved together with the cut away portions 14 telescopically engaged. Any suitable guide means may be provided so that when the sections are placed together their relative positions will be such that the slots 18 will be opposite the bolts 16. After the sections are forced together to a certain extent, the bolts 16 are swung upon their pivots 15 to bring the lugs 17 into the slots 18, after which the nuts 19 are tightened to clamp the two sections together.

Whenever it is desired to remove a tire, the reverse operation is gone through with, that is the nuts are loosened to release the lugs 17 after which the bolts are swung out of the way to permit separation of the sections.

From the foregoing description and a study of the drawings it will be apparent that I have thus provided a simply constructed and consequently inexpensive demountable rim which may be held upon the wheel in any ordinary or preferred manner and which is so formed that it may be quickly and easily opened up to facilitate removel of the tire. It is to be observed that no special tools are necessary as an ordinary wrench is sufficient to perform all the acts necessary.

While I have shown and described the preferred embodiment of the invention, it is of course to be understood that I reserve the right to make such changes in the form, construction and arrangememnt of parts as will not depart from the spirit of the invention or the scope of the subjoined claims.

Having thus described my invention I claim:

1. A rim formed of similar sections telescopically engaged, said sections having their outer edges formed with tire retaining flanges, the outer edge of one section being formed with a series of slots, a series of bolts pivoted upon the other section opposite to said slots, hook like lugs slidable on said bolts and adapted to enter said slots, and nuts threaded upon said bolts and engaging said lugs.

2. A rim formed of similar sections telescopically engaged, said sections having their outer edges formed with tire retaining flanges, the outer edge of one section being formed with a series of slots, a series of bolts pivoted upon the other section opposite to said slots, hook like lugs slidable on said bolts and adapted to enter said slots, and nuts threaded upon said bolts and engaging said lugs, the meeting edges of the sections being partially cut away to have interfitting relation with the outer and inner peripheries of both sections flush.

3. In a rim including a pair of sections provided at their edges with tire retaining flanges, means for holding the sections together comprising loop members carried by the flange of one section, eye bolts having their eyes pivoted upon said loop members, hooks slidably mounted on the bolts, the other rim section being formed with recesses receiving said hooks, and clamping nuts on said bolts engaging the hooks for holding them within said recesses.

In testimony whereof I affix my signature.

SIDNEY P. THORINGTON.